(12) United States Patent
Rajan et al.

(10) Patent No.: US 9,189,521 B2
(45) Date of Patent: *Nov. 17, 2015

(54) STATISTICS MANAGEMENT FOR DATABASE QUERYING

(71) Applicant: salesforce.com, inc., San Francisco, CA (US)

(72) Inventors: Chirag Rajan, San Francisco, CA (US); Jesse Collins, San Francisco, CA (US); Seung-Yeoul Yang, San Francisco, CA (US); Hoon Kim, Redwood City, CA (US)

(73) Assignee: salesforce.com, inc., San Francisco, CA (US)

( * ) Notice: Subject to any disclaimer, the term of this patent is extended or adjusted under 35 U.S.C. 154(b) by 115 days.

This patent is subject to a terminal disclaimer.

(21) Appl. No.: 14/044,657

(22) Filed: Oct. 2, 2013

(65) Prior Publication Data

US 2014/0040235 A1    Feb. 6, 2014

Related U.S. Application Data

(63) Continuation of application No. 13/525,124, filed on Jun. 15, 2012, now Pat. No. 8,577,870.

(60) Provisional application No. 61/499,304, filed on Jun. 21, 2011.

(51) Int. Cl.
*G06F 7/00* (2006.01)
*G06F 17/30* (2006.01)

(52) U.S. Cl.
CPC .... *G06F 17/30463* (2013.01); *G06F 17/30442* (2013.01); *G06F 17/30477* (2013.01)

(58) Field of Classification Search
CPC ................ G06F 17/30463; G06F 17/30442; G06F 17/30477
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |

(Continued)

OTHER PUBLICATIONS

Whitepaper, Article entitled, "The Force.com Multitenant Architecture," 2008.

(Continued)

*Primary Examiner* — Loan T Nguyen (74) *Attorney, Agent, or Firm* — Ingrassia Fisher & Lorenz, P.C.

(57) ABSTRACT

Methods and systems are provided for querying a database. One exemplary method for obtaining data from an on-demand database supporting one or more tenants involves obtaining model database statistics based on expected utilization information for a tenant and providing the model database statistics to the on-demand database. The on-demand database utilizes the model database statistics to generate a query plan and executes the query plan to obtain data from the model database statistics.

20 Claims, 3 Drawing Sheets

(56) References Cited

U.S. PATENT DOCUMENTS

| | | |
|---|---|---|
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| 6,341,277 B1 | 1/2002 | Coden et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,529,728 B2 | 5/2009 | Weissman et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,890,491 B1* | 2/2011 | Simmen .......... 707/713 |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0088579 A1 | 5/2003 | Brown et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1* | 3/2005 | Weissman et al. .......... 707/4 |
| 2005/0091098 A1 | 4/2005 | Brodersen et al. |
| 2006/0021019 A1 | 1/2006 | Hinton et al. |
| 2006/0074934 A1 | 4/2006 | Dettinger et al. |
| 2006/0149695 A1 | 7/2006 | Bossman et al. |
| 2006/0161635 A1* | 7/2006 | Lamkin et al. .......... 709/217 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0274779 A1 | 10/2010 | Weissman et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |

OTHER PUBLICATIONS

USPTO Notice of Allowance for U.S. Appl. No. 13/525,124, mailed Jul. 3, 2013.

USPTO, Non-Final Office Action for U.S. Appl. No. 13/525,124, mailed Jan. 17, 2013.

"Oracle9i Database Performance Tuning Guide and Reference," Release, 2 (9.2), 5 Optimizer Hints, retrieved on Jun. 15, 2012 from http://docs.oracle.com/cd/B10501_0 1/server.920/a96533/h intsref. htm.

(56) References Cited

OTHER PUBLICATIONS

"Oracle® Database Performance Tuning Guide," 10g Release 2 (10.2), 14 Managing Optimizer Statistics, retrieved on Jun. 15, 2012 from http://docs.oracle.com/cd/B19306_01/server.102/b14211/stats.htm.

USPTO, Office Action in U.S. Appl. No. 13/525,101 mailed Feb. 6, 2013.
USPTO, Office Action in U.S. Appl. No. 13/525,101 mailed Oct. 30, 2013.
USPTO, Final Office Action in U.S. Appl. No. 13/525,101 mailed Jun. 5, 2014.

* cited by examiner

STATISTICS MANAGEMENT FOR DATABASE QUERYING

CROSS-REFERENCE TO RELATED APPLICATION(S)

This application is a continuation of U.S. patent application Ser. No. 13/525,124, filed Jun. 15, 2012, which claims the benefit of U.S. provisional patent application Ser. No. 61/499,304, filed Jun. 21, 2011.

TECHNICAL FIELD

Embodiments of the subject matter described herein relate generally to computer systems and networks configured to support applications executing on behalf of multiple tenants, and more particularly, embodiments of the subject matter relate to methods and systems for efficiently querying a multi-tenant database.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

During operation, there are numerous situations in which data and/or information needs to be retrieved from the multi-tenant database (e.g., for presentation to users). Most databases include management software that determines an optimal query plan for executing the query and retrieving the desired set of data and/or information. However, for dynamic multi-tenant databases, the database statistics that maintained by the database management software and utilized to determine the optimal query plan may not reflect the current state of the multi-tenant database, and therefore, may result in suboptimal query plans that are not the most efficient method of querying the multi-tenant database and may result in timeouts or other undesirable effects.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Embodiments of the subject matter described herein generally relate to efficiently querying on-demand multi-tenant databases by modifying the statistics maintained by the database to reflect the expected (or anticipated) utilization of the database. As described in greater detail below, a development database representative of the on-demand multi-tenant database is created and then modified based upon expected utilization information for the tenants supported by the multi-tenant database. In this regard, the tables and/or data entries of the development database are modified to reflect the expected (or anticipated) state of the on-demand multi-tenant database. After modifying the development database, database statistics are determined for the modified development database, and a relevant subset of those database statistics are used to generate model database statistics. As described in greater detail below, the model database statistics are based on or otherwise representative of the relevant subset of the development database statistics and/or a subset of the expected utilization information, and as such, are representative of the expected (or anticipated) state of the on-demand multi-tenant database. After the model database statistics are obtained, the statistics that are maintained and utilized by the on-demand multi-tenant database to generate query plans are modified to reflect the model database statistics. Thus, the model database statistics influence the query plans generated and/or executed by the on-demand multi-tenant database. In one or more embodiments, the model database statistics are maintained by a development server in an Extensible Markup Language (XML) formatted file, and an application server accesses or otherwise receives the XML file and updates the database statistics maintained by the on-demand multi-tenant database to reflect changes to the XML file, as described in greater detail below.

Figure 1:
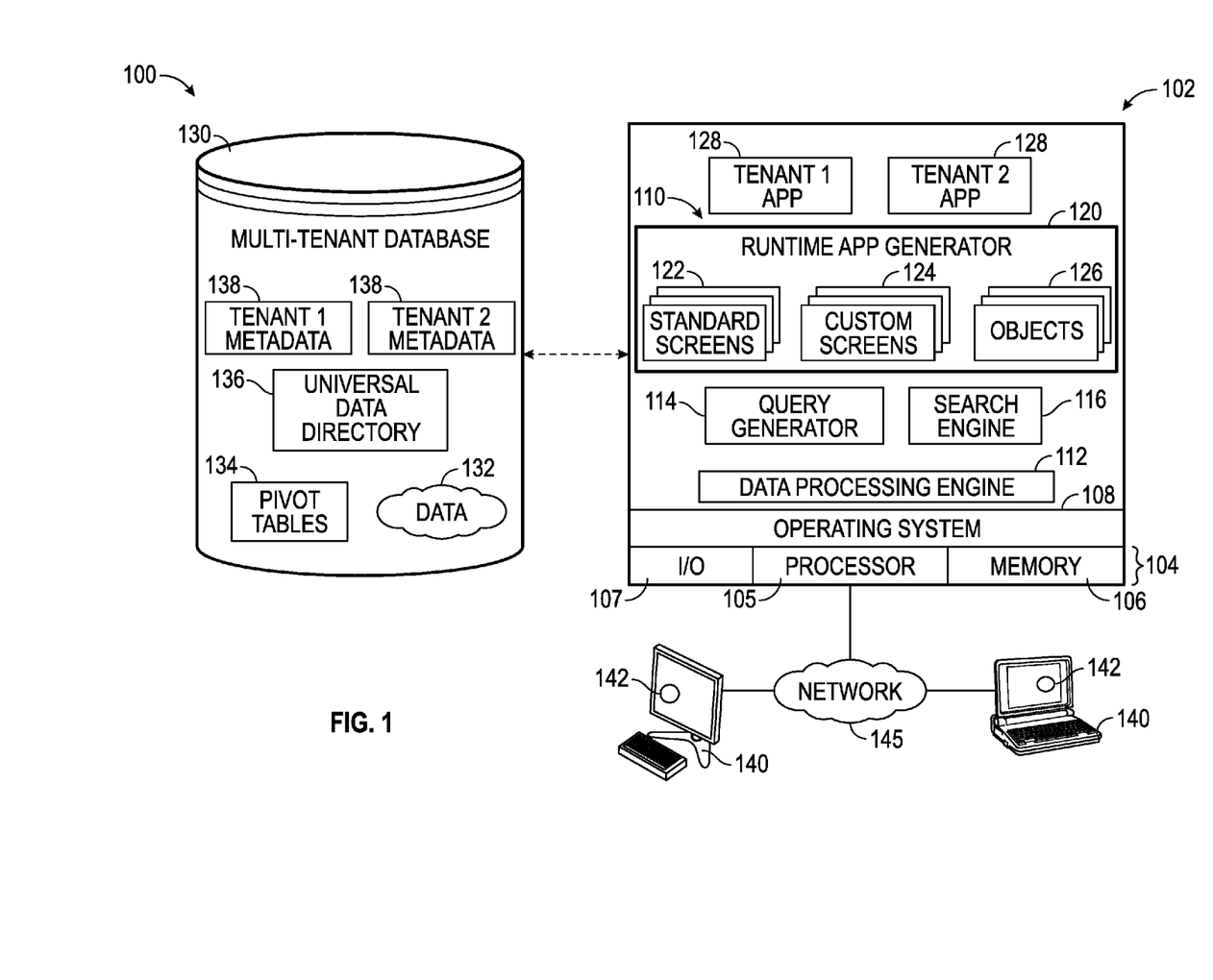
FIG. 1 is a block diagram of an exemplary multi-tenant system.

Turning now to FIG. 1, an exemplary multi-tenant system 100 includes a server 102 that dynamically creates and supports virtual applications 128 based upon data 132 from a common database 130 that is shared between multiple tenants, alternatively referred to herein as a multi-tenant database. Data and services generated by the virtual applications 128 are provided via a network 145 to any number of client devices 140, as desired. Each virtual application 128 is suitably generated at run-time (or on-demand) using a common application platform 110 that securely provides access to the data 132 in the database 130 for each of the various tenants subscribing to the multi-tenant system 100. In accordance with one non-limiting example, the multi-tenant system 100 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 130. In this regard, each tenant includes one or more users associated with, assigned to, or otherwise belonging to that respective tenant. To put it another way, each respective user within the multi-tenant system 100 is associated with, assigned to, or otherwise belongs to a particular tenant of the plurality of tenants supported by the multi-tenant system 100. Tenants may represent customers, customer departments, business or legal organizations, and/or any other entities that maintain data for particular sets of users within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other tenants.

The multi-tenant database 130 is any sort of repository or other data storage system capable of storing and managing the data 132 associated with any number of tenants. The database 130 may be implemented using any type of conventional database server hardware. In various embodiments, the database 130 shares processing hardware 104 with the server 102. In other embodiments, the database 130 is implemented using separate physical and/or virtual database server hardware that communicates with the server 102 to perform the various functions described herein. In an exemplary embodiment, the database 130 includes a database management system or other equivalent software capable of determining an optimal query plan for retrieving and providing a particular subset of the data 132 to an instance of virtual application 128 in response to a query initiated or otherwise provided by a virtual application 128, as described in greater detail below. The multi-tenant database 130 may alternatively be referred to herein as an on-demand database, in that the multi-tenant database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 is implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like. The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

Still referring to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130, as described in greater detail below. Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. As noted above, the virtual application 128 may contain Java, ActiveX, or other content that can be presented using conventional client software running on the client device 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128.

Figure 2:
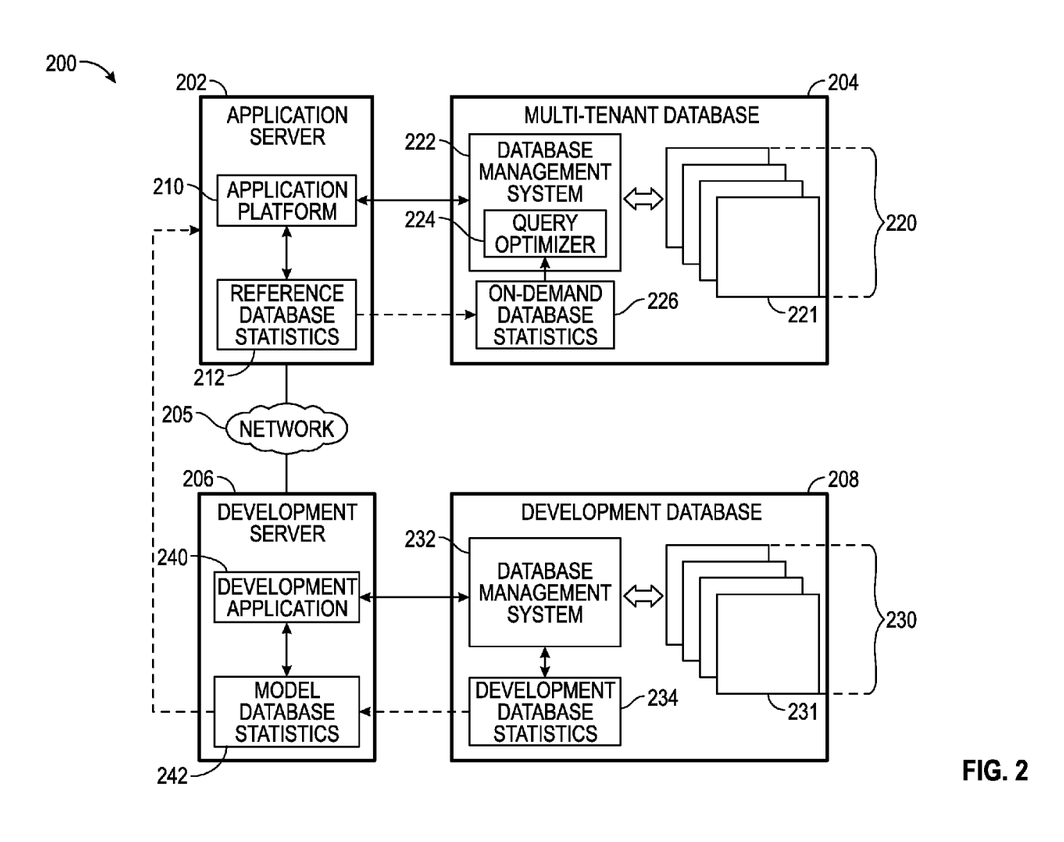
FIG. 2 is a block diagram of an exemplary database statistics management system suitable for use with the multi-tenant system of FIG. 1 in accordance with one or more embodiments.

FIG. 2 illustrates an exemplary database statistics management system 200 suitable for use with a multi-tenant computing system, such as the multi-tenant system 100. The illustrated database statistics management system 200 includes an application server 202 (e.g., server 102), a multi-tenant database 204 (e.g., database 130), a development server 206, and a development database 208. Some elements in the database statistics management system 200 of FIG. 2 are similar to counterpart elements described above in the context of multi-tenant system 100 of FIG. 1, and such common features and/or functionality will not be redundantly described in the context of FIG. 2. In this regard, the application server 202 is coupled to the multi-tenant database 204 and generates or otherwise supports an application platform 210 (e.g., application platform 120) to provide virtual applications (e.g., virtual applications 128) to users and/or tenants in a multi-tenant system, as described above in the context of FIG. 1. It should be understood that FIG. 2 is a simplified representation of the database statistics management system 200 for purposes of explanation and is not intended to limit the subject matter described herein in any way. For example, although not illustrated in FIG. 2, in practice, the development server 206 includes processing hardware (e.g., processing hardware 104) configured to support operation of the database statistics management system 200 and the various database statistics management tasks and processes described herein.

In the illustrated embodiment, the multi-tenant database 204 maintains data for the various tenants (e.g., data 132) in a plurality of different tables 220. In this regard, the data maintained by the multi-tenant database 204 may be understood as on-demand data that is accessible to tenants and/or users in a multi-tenant system and capable of being dynamically added, deleted, or otherwise modified in real-time by its associated tenant and/or user via a virtual application generated by the application platform 210. Each table 220 contains a subset of the data maintained by the multi-tenant database 204 and includes a number of rows corresponding to the number of entries in that respective table 220 and a number of columns across the rows that correspond to the different pieces of data and/or information maintained in that respective table 220. By virtue of the multi-tenant database 204 being part of an on-demand multi-tenant system, the number of entries in a respective table 220 in the multi-tenant database 204 may vary dynamically in response to tenants and/or users the multi-tenant system adding and/or deleting data entries.

In an exemplary embodiment, the multi-tenant database 204 includes a database management system 222 that provides an interface between the data maintained by the multi-tenant database 204 (e.g., in tables 220) and the application server 202 and/or other external elements. The database management system 222 generally represents the software module of the multi-tenant database 204 that receives queries from the application platform 210 (e.g., from query generator 114) and generates or otherwise supports a query optimizer 224 that determines an optimal query plan (e.g., join orders, join methods, access paths, key indexes, and the like) for performing a received query based on database statistics 226 maintained by the database management system 222. The database statistics 226 include information pertaining to the content and/or arrangement of the data maintained in the tables 220 of the multi-tenant database 204, such as, for example, the number of rows and/or columns of a particular table 220, the number of different distinct values for each column of a particular table 220, schema information and/or other relational information for the various tables 220. The database management system 222 executes or otherwise performs the received query in accordance with the query plan determined by the query optimizer 224 to retrieve the desired subset of the data maintained in the tables 220 and/or multi-tenant database 204, and the database management system 222 provides the retrieved data to the application server 202 and/or the application platform 210 (e.g., the query generator and/or the querying virtual application) as the result of the query. The database statistics 226 may alternatively be referred to herein as on-demand database statistics because the database statistics 226 influence the query plans determined and/or executed by the database management system 222 and/or query optimizer 224 to support the virtual applications generated and/or provided by the application server 202.

In some embodiments, upon creation of a new table in the multi-tenant database 204, the database management system 222 automatically determines initial statistics for the new table 220 (e.g., the number of rows and/or columns, the number of different distinct values for each column, and the like) and updates the on-demand database statistics 226 to include those statistics for the new table. However, due to the dynamic and multi-tenant nature of the tables 220 (and the data contained therein), the initial statistics determined by the database management system 222 for one or more tables 220 of the multi-tenant database 204 may become inaccurate over time, which may, in turn, result in the query optimizer 224 generating suboptimal query plans. As described in greater detail below, rather than the database management system 222 continuously and/or periodically re-determining statistics for the multi-tenant database 204, the application server 202 and/or application platform 210 updates or otherwise modifies the on-demand database statistics 226 maintained by the database management system 222 in the multi-tenant database 204 to contain values and/or criteria for the statistics of the various tables 220 (e.g., the number of rows and/or columns, the number of different distinct values for each column, and the like) that provide a more accurate representation of the real-time data in the multi-tenant database 204. Thus, processing resources of the multi-tenant database 204 and/or the database management system 222 which would otherwise be allocated to determining statistics for the multi-tenant database 204 are available to handle queries from the application server 202.

Still referring to FIG. 2, in exemplary embodiments, the development database 208 maintains data in a plurality of different tables 230 that is representative of the real-time data likely to be maintained by the multi-tenant database 204. In this regard, the data maintained by the development database 208 may be instantiated by copying the data and/or tables 220 maintained by the multi-tenant database 204. For example, a backup of the multi-tenant database 204 may be obtained using built-in backup/restore functionality of the database management system 222, and the backup of the multi-tenant database 204 may then be restored into the development database 208 using the built-in backup/restore functionality of the database management system 232 of the development database 208. In some embodiments, the database management system 232 executes a post-processing script to delete or otherwise remove potentially sensitive and/or confidential information from the development database 208 after restoring the backup of the multi-tenant database 204 to the development database 208. While the data maintained by the multi-tenant database 204 is available on-demand to tenants and/or users in a multi-tenant system, the data maintained by the development database 208 is not available to tenants and/or users in a multi-tenant system. As described above in the context of the multi-tenant database 204, the database management system 232 provides an interface to the data maintained by the development database 208 (e.g., in tables 230) and determines database statistics 234 for the development database 208 based on the data maintained in the tables 230.

In exemplary embodiments, the development server 206 is coupled to the development database 208 and generates, executes, or otherwise supports a development application 240 that interacts with the database management system 232 to modify the data and/or the tables 230 maintained by the development database 208 based on expected utilization information for one or more of the tables 220 in the multi-tenant database 204 and generate model database statistics 242 for the multi-tenant database 204 that are influenced by the expected utilization information and/or based on the modified development database 208. Depending on the embodiment, the expected utilization information for a particular table 220 in the multi-tenant database 204 may be provided by one or more tenants having data maintained in that table 220 or the development application 240 may predict or otherwise determine the expected utilization information, as described in greater detail below. In an exemplary embodiment, the development application 240 maintains the model database statistics 242 in an XML formatted file. The development server 206 is communicatively coupled to the application server 202 via a network 205 (e.g., network 145), and the model database statistics 242 are provided to and/or otherwise accessed by the application platform 210 on the application server 202. As described in greater detail below, the application platform 210 and/or application server 202 maintains an XML file of reference database statistics 212, wherein in response to identifying a difference between the model database statistics 242 and the updated reference database statistics 212, the application platform 210 and/or application server 202 updates the updated reference database statistics 212 maintained on the application server 202 to match the model database statistics 242 provided by the development server 206. Additionally, after updating the reference database statistics 212 to reflect changes to the model database statistics 242, the application platform 210 and/or application server 202 modifies or otherwise updates a subset of the on-demand database statistics 226 to match the updated reference database statistics 212 maintained by the application server 202. In this manner, the updated on-demand database statistics 226 are representative of the data expected (or anticipated) to be maintained by the multi-tenant database 204, and thus, provide a more accurate representation of the real-time data in the multi-tenant database 204 than the statistics determined by the database management system 222 upon creation of the tables 220 as the content of the multi-tenant database 204 varies over time.

Figure 3:
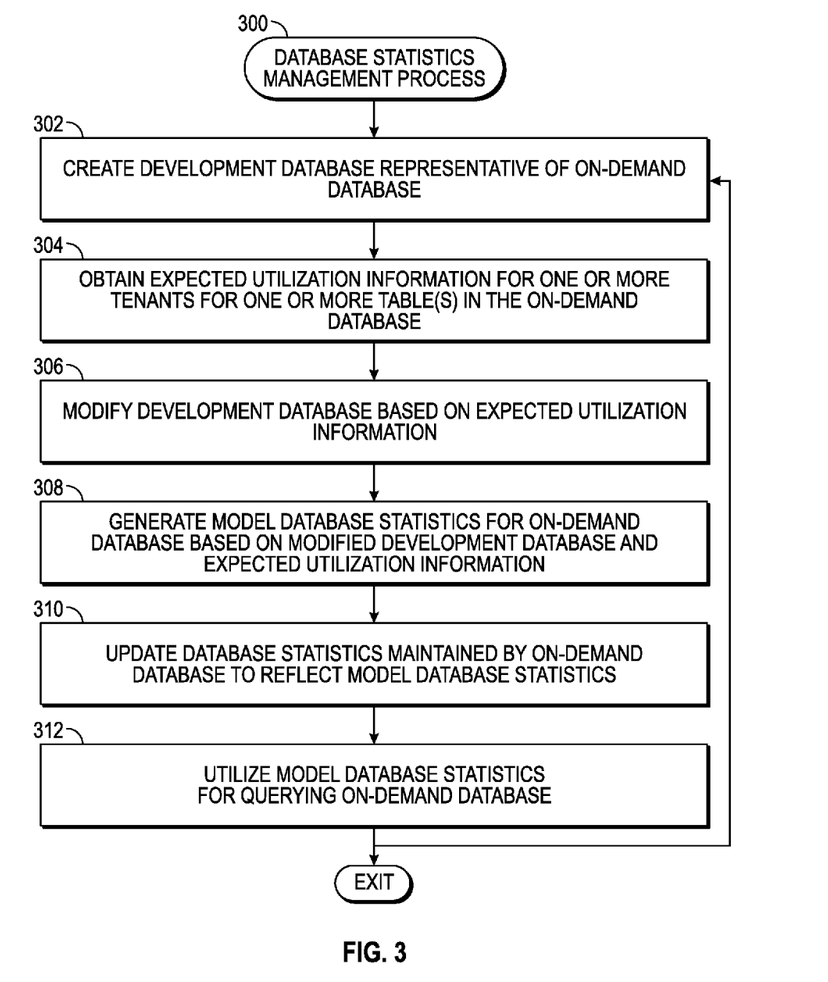
FIG. 3 is a flow diagram of an exemplary database statistics management process that may be performed by the multi-tenant system of FIG. 1 and/or the database statistics management system of FIG. 2 in accordance with one or more exemplary embodiments.

FIG. 3 depicts an exemplary embodiment of a database statistics management process 300 suitable for implementation in a multi-tenant computing system to obtain data and/or information from an on-demand multi-tenant database in an efficient manner. The various tasks performed in connection with the illustrated process 300 may be performed by software, hardware, firmware, or any combination thereof. For illustrative purposes, the following description may refer to elements mentioned above in connection with FIGS. 1-2. In practice, portions of the database statistics management process 300 may be performed by different elements of the multi-tenant system 100 and/or the database statistics management system 200, such as, for example, the application server 102, 202, the application platform 110, 210, the multi-tenant database 130, 204, the development server 206, the development application 240, and/or the database management systems 222, 232. It should be appreciated that the database statistics management process 300 may include any number of additional or alternative tasks, the tasks need not be performed in the illustrated order and/or the tasks may be performed concurrently, and/or the database statistics management process 300 may be incorporated into a more comprehensive procedure or process having additional functionality not described in detail herein. Moreover, one or more of the tasks shown and described in the context of FIG. 3 could be omitted from a practical embodiment of the database statistics management process 300 as long as the intended overall functionality remains intact.

Referring to FIG. 3, and with continued reference to FIGS. 1-2, in an exemplary embodiment, the database statistics management process 300 begins by creating or otherwise generating a development database representative of the on-demand multi-tenant database (task 302). In this regard, the development database is instantiated so that the initial contents of the development database are substantially identical to the contents of the multi-tenant database. For example, in accordance with one or more embodiments, the development database 208 is instantiated by copying the tables 220 of the multi-tenant database 204 to the development database 208 so that the initial content of the tables 230 is identical to the content of the tables 220. To put it another way, each of the initial tables 230 of the development database 208 correspond to the current tables 220 of the multi-tenant database 204 when the development database 208 is created or otherwise instantiated.

After a development database representative of the on-demand multi-tenant database is created, the database statistics management process 300 continues by obtaining, for one or more of the tenants supported by the on-demand multi-tenant database, expected (or anticipated) utilization information for one or more tables of the on-demand multi-tenant database (task 304). In this regard, the expected utilization information represents a particular tenant's likely usage of a particular table at a particular time in the future. The expected utilization information may include the expected amount of data entries (or rows) for the particular table of interest along with the expected number of distinct values for one or more columns of that particular table, minimum and/or maximum values for one or more columns of the particular table, the faction (or percentage) of values in a particular column that are null, the number of data blocks in a particular table or index, the depth of the B-tree in a particular index, and the clustering factor (i.e., how closely the ordering of an index corresponds to the physical ordering of the data in the corresponding table) of a particular index, and the like. Depending on the embodiment, the expected utilization information may pertain to an existing table in the multi-tenant database or a future (or new) table to be created in the multi-tenant database. In accordance with one or more embodiments, the development application 240 receives the expected utilization information from the individual tenants supported by the multi-tenant database 204. For example, the application platform 110, 210 may prompt a user belonging to a particular tenant (e.g., via a virtual application 128 presented on a client device 140) to provide the expected utilization information for a new or existing table in the multi-tenant database 204 and transmit the expected utilization information provided by the user to the development application 240. In other embodiments, the development application 240 may calculate or otherwise determine the expected utilization information for a tenant based on that tenant's current and/or past utilization of one or more tables of the multi-tenant database 204. For example, for an existing table, the development application 240 may analyze a tenant's current and/or past utilization of the table, and based on that utilization history, estimate or otherwise project the expected utilization information at a particular time in the future (e.g., using various projection algorithms, models and/or metrics). Similarly, for a new table to be created in the multi-tenant database 204, the development application 240 may analyze a tenant's utilization information for another similar table, and based on that prior utilization information, project the expected utilization information for the new table.

Still referring to FIG. 3, in an exemplary embodiment, the database statistics management process 300 continues by modifying the development database based on the expected utilization information (task 306). In this regard, the development application 240 modifies the content of one or more tables 230 of the development database 208 to reflect the expected utilization for those corresponding tables 220 of the multi-tenant database 204. For example, if the expected utilization information for a first tenant indicates that the first tenant is likely to have a different number of data entries in a particular table 221 of the multi-tenant database 204 in the future relative to the first tenant's current number of entries in the table 221, the development application 240 creates additional entries and/or deletes existing entries for the first tenant in the table 231 of the development database 208 that corresponds to that table 221 of the multi-tenant database 204 so that the number of data entries for the first tenant in the table 231 is equal to the expected number of data entries for the first tenant. In some embodiments, the development application 240 may modify the content of the data entries for the first tenant in the table 231 to have the expected number of distinct values for that column of the table 221, the expected minimum and/or maximum values for that column of the table 221, or the like. Likewise, if the expected utilization information for a second tenant indicates that the second tenant is likely to have a different number of data entries in that table 221 than the second tenant's current number of entries in the table 221, the development application 240 creates additional entries and/or deletes existing entries for the second tenant in the table 231 for the second tenant in the table 231 of the development database 208 so that the number of data entries for the second tenant in the table 231 is equal to the expected number of data entries for the second tenant. Additionally, the development application 240 may modify the content of the data entries for the second tenant in the table 231 to have the expected values (or range thereof) indicated by the second tenant's expected utilization information.

For each respective table 220 in the multi-tenant database 204, the development application 240 may modify the corresponding table 230 in the development database 208 to reflect the expected utilization information for that respective table 220 that was obtained for each of the tenants that utilizes that respective table 220. For a new (or future) table that has not been created in the multi-tenant database 204, the development application 240 interacts with the database management system 232 to create the new table in the development database 208 that reflects the expected utilization information for that new table. For example, if the expected utilization information for a first tenant indicates that the first tenant is likely to have one hundred different data entries in the new table with a certain number of distinct values and/or a range of values for a first column of the new table, the development application 240 creates the new table in the development database 208 having one hundred rows for the first tenant, wherein values for the first column across those one hundred rows have a range and/or a number of distinct values corresponding to the expected values for the first tenant. Likewise, if the expected utilization information for a second tenant indicates that the second tenant is likely to have ten different data entries in that new table, the development application 240 creates ten rows in the new table of the development database 208 wherein values for the first column across those ten rows correspond to the second tenant's expected utilization information. In this manner, the development application 240 modifies the development database 208 based on the expected utilization information for the various existing and/or future tables of the multi-tenant database 204 for the various tenants supported by the multi-tenant database 204 so that the tables 230 in the development database 208 reflect the anticipated future state of the multi-tenant database 204 and/or tables 220 at some point in the future.

In an exemplary embodiment, the database statistics management process 300 continues by generating or otherwise obtaining model database statistics for the on-demand multi-tenant database based on the modified development database and the expected utilization information (task 308). In this regard, after modifying the tables 230 of the development database 208, the development application 240 signals, instructs, or otherwise commands the database management system 232 to determine database statistics 234 for the development database 208. After the database management system 232 determines the modified development database statistics 234, the development application 240 queries the database management system 232 to obtain, from the database management system 232, a subset of the development database statistics 234 that are most likely to influence the query optimizer 224. For example, for a particular table 231, the development application 240 may query the database management system 232 for the number of rows in a particular table 230, the number of distinct values for a particular column of a particular table 230, the number of distinct keys for an index of a particular table 230, or the like. In this regard, by requesting the most relevant subset of the development database statistics 234 from the database management system 232, the development application 240 effectively filters or otherwise excludes the remaining development database statistics 234 that are unlikely to influence the query optimizer 224 from the model database statistics. Based on the relevant subset of the development database statistics 234 obtained from the development database 208 and/or the expected utilization information obtained by the development application 240, the development application 240 generates model database statistics 242 consisting of the statistics that are likely to influence the query optimizer 224 and having values representative of the anticipated state of the multi-tenant database 204. In this regard, when the development application 240 does not modify the contents of the tables 230 to reflect the expected values for the various columns of the tables 220, the development application 240 utilizes the expected utilization information (e.g., expected number of distinct values for particular columns of the tables 220, expected minimum and/or maximum values for particular columns of the tables 220, or the like) to augment the relevant subset of the development database statistics 234 and create the model database statistics 242. In an exemplary embodiment, the model database statistics 242 are maintained in an XML file that is created by the development application 240 and maintained by the development server 206.

After generating the model database statistics based on the modified development database and the expected utilization information, the model database statistics are provided to the on-demand multi-tenant database by modifying or otherwise updating the on-demand database statistics maintained by the on-demand multi-tenant database to reflect the model database statistics (task 310). In an exemplary embodiment, the application platform 210 receives or otherwise accesses the XML file on the development server 206 that contains the model database statistics 242 and compares the model database statistics 242 to the reference database statistics 212 maintained by the application server 202. In response to identifying a difference between the reference database statistics 212 and the model database statistics 242, the application platform 210 modifies the reference database statistics 212 to reflect the model database statistics 242. In some embodiments, the application platform 210 parses the XML files for the two sets of database statistics 212, 242 overwrites portions of the reference database statistics 212 that differ from the model database statistics 242 with the values from the model database statistics XML file. In other embodiments, the application platform 210 downloads or otherwise copies the XML file for the model database statistics 242 from the development server 206 and overwrites the previous XML file for the reference database statistics 212 with the downloaded XML file.

After updating the reference database statistics 212, the application platform 210 automatically updates the on-demand database statistics 226 to reflect the updated reference database statistics 212, and thereby, reflect the model database statistics 242. In this regard, the application platform 210 interacts with the database management system 222 to overwrite portions of the on-demand database statistics 226 (e.g., the relevant subset of the on-demand database statistics) with values and/or criteria from the updated reference database statistics 212 so that portions of the on-demand database statistics 226 correspond to the model database statistics 242. In other words, the application platform 210 modifies the relevant subset of the on-demand database statistics 226 to have values and/or criteria corresponding to those provided by the model database statistics 242. Thus, the updated on-demand database statistics 226 include values and/or criteria for one or more statistics that may not be representative of the current (or instantaneous) state of the multi-tenant database 204, but rather, reflect the expected (or anticipated) state of the multi-tenant database 204 at some point in the future. For example, as described above, the database management system 222 may initially determine reference database statistics for a first table 221 automatically in response to creating the first table 221 in the multi-tenant database 204. The application platform 210 modifies the subset of the on-demand database statistics 226 corresponding to the first table 221 with values and/or criteria determined by the database management system 232 and/or the development application 240 for those statistics based on the modified first table 231 that reflects the expected utilization of the first table 221 and/or other expected utilization information for the first table 221. Thus, the updated on-demand database statistics 226 for the first table 221 account for changes in the number of entries in the first table 221 and/or the content of the first table 221 that occur after the database management system 222 determines the initial reference database statistics for the first table 221.

After the database statistics maintained by the on-demand multi-tenant database are updated to reflect the model database statistics determined based on the development database, the database statistics management process 300 continues by utilizing those updated database statistics for subsequent queries of the on-demand multi-tenant database (task 312). In this regard, virtual applications 128 generated or otherwise executed by the application platform 110, 210 produce queries that are provided to the query generator 114, which, in turn, constructs query statements (e.g., in SQL or another suitable database querying language) that are provided by the application platform 110, 210 to the database management system 222. In response to a query statement, the query optimizer 224 utilizes the on-demand database statistics 226 to determine a plurality of possible query plans (e.g., combinations and/or sequences of access paths, join operations, join orders, tables and/or indexes, and the like) based on the query statement and the on-demand database statistics 226 and identifies the possible query plan having the lowest estimated cost (e.g., based on required computing resources, amount of computing time required, and the like) as the optimal query plan. In this manner, the query plans determined by the query optimizer 224 are influenced by the model database statistics 242 which are represented by a subset of the on-demand database statistics 226. After the query optimizer 224 determines the optimal query plan, the database management system 222 executes or otherwise performs the query using that query plan to obtain the results of the query statement from the tables 220 of the multi-tenant database 204. The resultant data retrieved from the multi-tenant database 204 is then provided to the querying instance of the virtual application 128 via the application platform 110, 210. In this regard, by virtue of the relevant subset of the on-demand database statistics 226 being updated to reflect the expected (or anticipated) state of the multi-tenant database 204, the query optimizer 224 is capable of determining efficient query plans without requiring the database management system 222 to continuously update and/or re-determine the on-demand database statistics 226 as the size of the tables 220 and/or the contents of the on-demand multi-tenant database 204 dynamically change over time. Thus, timeouts can be reduced without undesirably consuming processing resources of the database management system 222 and/or multi-tenant database 204 to re-determine statistics for the on-demand multi-tenant database 204 while the on-demand multi-tenant database 204 is being accessed concurrently by users and/or tenants.

In exemplary embodiments, the loop defined by tasks 302, 304, 306, 308, 310 and 312 may repeat as desired throughout operation of the multi-tenant system. In this regard, the development database 208 may be periodically updated or modified to reflect the current state of the multi-tenant database 204 (e.g., by periodically copying the tables 220 to the development database 208) and account for variations between the actual utilization of the tables 220 of the multi-tenant database 204 and the previously expected utilization information (e.g., task 302). Similarly, the expected utilization information may be periodically updated and/or re-determined to account for changes in the usage by individual tenants (e.g., task 304). The recently obtained expected utilization information may then be used to modify the updated development database, generate updated model database statistics, and update the on-demand database statistics accordingly for use in generating query plans for subsequent queries of the on-demand multi-tenant database (e.g., tasks 306, 308, 310, 312).

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, database querying, database statistics, query plan generation, XML and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another. That said, in exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of obtaining data from a database, the database including a query optimizer to generate a query plan based on on-demand database statistics, the method comprising:
   obtaining model database statistics representative of an expected state of the database in the future, the model database statistics being generated based on a subset of expected utilization information for a tenant supported by the database, the expected utilization information representing the tenant's likely usage of a table in the database at a time in the future, wherein generating the model database statistics comprises:
      obtaining a subset of database statistics that are most likely to influence the query optimizer; and
      generating the model database statistics that are likely to influence the query optimizer based on the subset of database statistics and the subset of the expected utilization information; and
   modifying on-demand database statistics maintained by the database to reflect the model database statistics, wherein the query plan generated by the database to obtain the data based on the on-demand database statistics is influenced by the model database statistics.

2. The method of claim 1, wherein the expected utilization information includes an expected amount of data entries for the table, an expected number of distinct values for a column of the table, a minimum value for a column of the table, a maximum value for a column of the table, a percentage of values in a particular column that are null, a number of data blocks in the table, a depth of a B-tree, or a clustering factor.

3. The method of claim 1, wherein the table comprises a future table.

4. The method of claim 3, wherein the expected utilization information includes an expected amount of data entries for the future table, an expected number of distinct values for a column of the future table, a minimum value of a column of the future table, a maximum value for a column of the future table, or a number of data blocks in the future table.

5. The method of claim 1, wherein the expected utilization information corresponds to a new table to be created in the database.

6. The method of claim 1, further comprising obtaining the expected utilization information for the database from the tenant.

7. The method of claim 1, further comprising determining the expected utilization information for the database based at least in part on existing utilization information for the tenant.

8. The method of claim 7, wherein:
   determining the expected utilization information comprises projecting the expected utilization information at the time in the future based on the tenant's utilization history for the table.

9. The method of claim 1, further comprising:
   obtaining a subset of database statistics determined by a database management system based on the expected utilization information; and
   creating the model database statistics based at least in part on the obtained subset of database statistics determined by the database management system.

10. The method of claim 9, wherein creating the model database statistics comprises creating an extensible markup language (XML) file including the obtained subset of database statistics determined by the database management system.

11. The method of claim 10, further comprising:
   maintaining the XML file including the obtained subset of database statistics determined by the database management system; and
   maintaining a second XML file containing reference database statistics for the database, wherein:
      obtaining the model database statistics comprises modifying the second XML file to reflect the XML file; and
      providing the model database statistics comprises automatically modifying the on-demand database statistics maintained by the database to reflect the second XML file after modifying the second XML file, the database generating the query plan based on the on-demand database statistics maintained by the database.

12. The method of claim 1, the database maintaining database statistics for a first table of the database, wherein:
   obtaining the model database statistics for the database comprises obtaining the model database statistics for the first table based on the expected utilization information for the tenant for the first table; and
   providing the model database statistics comprises modifying the database statistics to reflect the model database statistics.

13. The method of claim 1, wherein the model database statistics are representative of an expected state of the database in the future.

14. The method of claim 1, wherein generating the model database statistics comprises augmenting the subset of database statistics utilizing the subset of the expected utilization information.

15. The method of claim 1, wherein providing the model database statistics comprises an application server modifying the on-demand database statistics maintained by the database to match reference database statistics after updating the reference database statistics in response to identifying a difference between the model database statistics and the reference database statistics.

16. The method of claim 1, wherein obtaining the model database statistics comprises generating the model database statistics based on the expected utilization information without consuming processing resources of the database.

17. A method of obtaining data from a database, the method comprising:
   generating model database statistics having values representative of an anticipated state of the database in the future based on expected utilization information for a tenant supported by the database, wherein generating the model database statistics comprises:

obtaining a subset of database statistics determined by a database management system based on the expected utilization information; and creating the model database statistics having the values representative of the anticipated state of the database based at least in part on the obtained subset of database statistics determined by the database management system; and providing the model database statistics to the database by modifying on-demand database statistics maintained by the database to reflect the model database statistics, wherein:

a query optimizer of the database generates a query plan based on the on-demand database statistics; and the query plan generated by the database to obtain the data is influenced by the model database statistics.

18. A system comprising:

a database to maintain on-demand database statistics, the database including a query optimizer to generate a query plan based on the on-demand database statistics; and a server coupled to the database to obtain model database statistics for the database and provide the model database statistics to the database by modifying the on-demand database statistics maintained by the database to reflect the model database statistics, wherein:

the model database statistics are representative of an expected state of the database in the future and are generated based on a subset of expected utilization information for a tenant supported by the database and a subset of database statistics that are most likely to influence the query optimizer;

the expected utilization information represents the tenant's likely usage of a table in the database at a time in the future; and the query plan to obtain data that is generated by the database based on the on-demand database statistics is influenced by the model database statistics.

19. The system of claim 18, wherein the table comprises a future table.

20. The system of claim 18, wherein the expected utilization information corresponds to a new table to be created in the database.

* * * * *